United States Patent
Nagata et al.

(10) Patent No.: US 7,604,423 B2
(45) Date of Patent: Oct. 20, 2009

(54) INTERCHANGEABLE-LENS CAMERA

(75) Inventors: Hideki Nagata, Hachioji (JP); Minoru Omaki, Kunitachi (JP); Hirofumi Tsuchida, Kunitachi (JP); Toshiyuki Nagaoka, Akishima (JP)

(73) Assignee: Olympus Corporation, Tokyo (JP)

( * ) Notice: Subject to any disclaimer, the term of this patent is extended or adjusted under 35 U.S.C. 154(b) by 16 days.

(21) Appl. No.: 11/903,475

(22) Filed: Sep. 21, 2007

(65) Prior Publication Data

US 2008/0089680 A1    Apr. 17, 2008

(30) Foreign Application Priority Data

Sep. 29, 2006   (JP) .............. 2006-267470

(51) Int. Cl.
  *G03B 17/00*   (2006.01)
  *H04N 5/225*   (2006.01)
  *G02B 7/02*    (2006.01)
  *G03B 17/12*   (2006.01)

(52) U.S. Cl. .................. 396/529; 396/532; 348/375; 359/819

(58) Field of Classification Search ............ 396/73, 396/260, 301, 529; 348/231.99, 335, 375
See application file for complete search history.

(56) References Cited

U.S. PATENT DOCUMENTS

| | | | | |
|---|---|---|---|---|
| 4,038,671 A | * | 7/1977 | Schroder et al. | ............. 396/73 |
| 6,101,339 A | * | 8/2000 | Miki et al. | ................. 396/301 |
| 2002/0057910 A1 | * | 5/2002 | Murakami | .................. 396/260 |
| 2004/0201748 A1 | * | 10/2004 | Goldstein et al. | ...... 348/231.99 |
| 2005/0068444 A1 | * | 3/2005 | Oshima et al. | ............. 348/335 |
| 2006/0187338 A1 | * | 8/2006 | May et al. | .................. 348/375 |

FOREIGN PATENT DOCUMENTS

JP    10-115858    5/1998
JP    2000-187271  7/2000

* cited by examiner

*Primary Examiner*—Melissa J Koval
(74) *Attorney, Agent, or Firm*—Kenyon & Kenyon LLP

(57) ABSTRACT

An interchangeable-lens camera including a camera body on which a lens unit is capable to mount. The camera body includes a lens mounting unit which is provided to the camera body and on which the lens unit is capable to mount at least one dummy mounting unit which is provided to the camera body and on which a device is capable to mount under the same lens mounting system as the lens mounting unit, and a processing unit for reading information about the lens unit mounted to the lens mounting unit; and the processing unit for reading information about the device mounted to the dummy mounting unit.

9 Claims, 9 Drawing Sheets

INTERCHANGEABLE-LENS CAMERA

BACKGROUND OF THE INVENTION

1. Field of the Invention

The present invention relates to a camera, in particular, to an interchangeable-lens camera provided with interchangeable lenses in a camera body.

2. Description of Related Art

In order to simplify carrying a replacement lens and to allow lens replacement to be performed quickly when required, the related art discloses a camera in which a dummy mounting unit for holding a lens, which is compatible with the lens mounting system of the replacement lens, is provided in part of the camera body (for example, see Japanese Unexamined Patent Application, Publication No. 2000-187271 (FIG. 3)).

BRIEF SUMMARY OF THE INVENTION

A first aspect is an interchangeable-lens camera including a camera body; and a lens unit configured to be removably mounted to the camera body, wherein the camera body includes a lens mounting unit for mounting the lens unit, at least one dummy mounting unit compatible with the same lens mounting system as the lens mounting unit, and information reading means for reading information about devices mounted to the lens mounting unit and the dummy mounting unit.

A second aspect is an interchangeable-lens camera according to the first aspect, wherein the camera body has an image display unit and a processing unit; and the processing unit reads information about the device mounted to the dummy mounting unit via the information reading means, and displays information about the device on the image display unit.

A third aspect is an interchangeable-lens camera according to the second aspect, wherein the processing unit reads information about the device mounted to the lens mounting unit and information about the device mounted to the dummy mounting unit via the information reading means and displays the information about each device on the image display unit.

A fourth aspect is an interchangeable-lens camera according to the second or the third aspect, wherein the devices are lens units, and the information about the devices is characteristics of lenses contained in the lens units.

A fifth aspect is an interchangeable-lens camera according to the first aspect, wherein the device mounted to the dummy mounting unit is an auxiliary battery compatible with the same lens mounting system as the lens unit.

A sixth aspect is an interchangeable-lens camera according to the fifth aspect, wherein the dummy mounting unit includes a power terminal configured to supply electrical power to the camera body from the auxiliary battery mounted thereto.

A seventh aspect is an interchangeable-lens camera according to the first aspect, wherein the device mounted to the dummy mounting unit is an auxiliary memory compatible with the same lens mounting system as the lens unit.

An eighth aspect is an interchangeable-lens camera according to the seventh aspect, wherein the dummy mounting unit includes an information terminal configured to supply information to the camera body from the auxiliary memory mounted thereto and supply information to the auxiliary memory from the camera body.

DETAILED DESCRIPTION OF THE INVENTION

Figure 1:
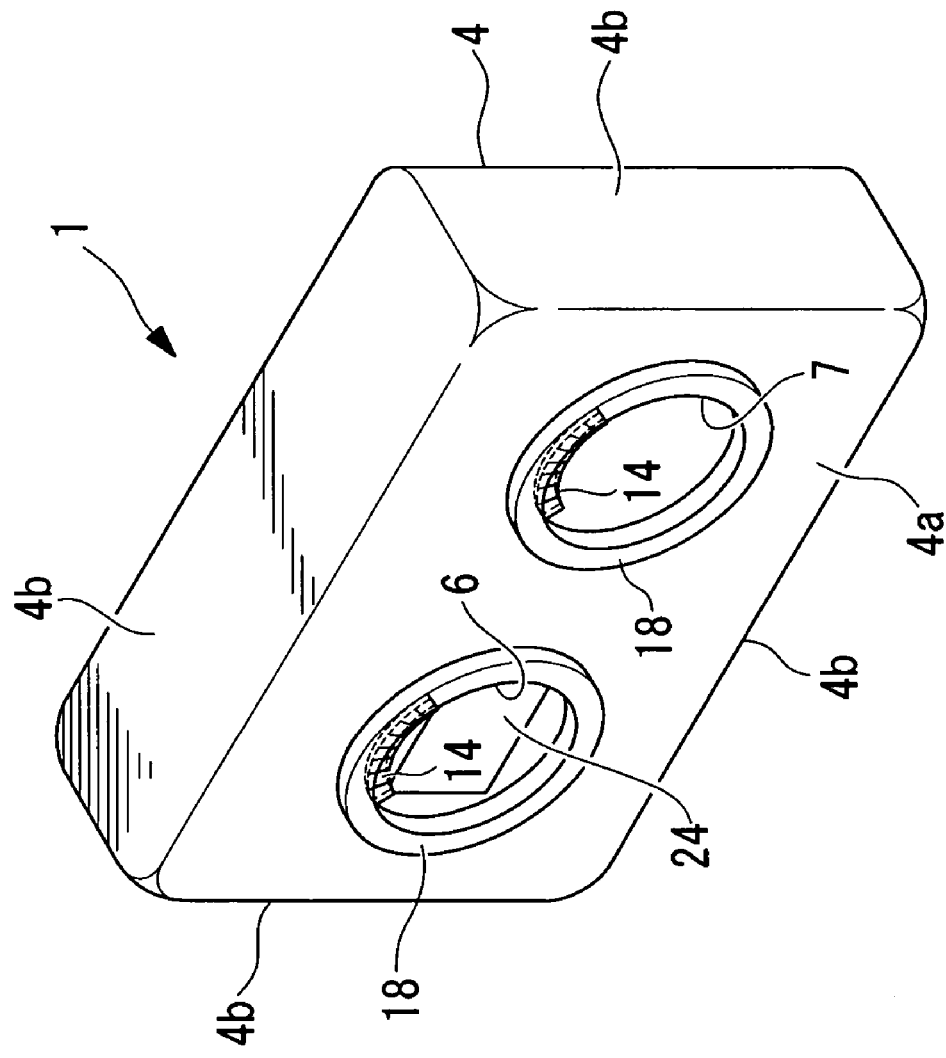
FIG. 1 is a schematic overall perspective view of a camera body of a digital camera according to an embodiment of the present invention.

An interchangeable-lens camera according to the present invention includes a camera body; and a lens unit configured to be removably mounted to the camera body, wherein the camera body includes a lens mounting unit for mounting the lens unit, at least one dummy mounting unit compatible with the same lens mounting system as the lens mounting unit, and information reading means for reading information about devices mounted to the lens mounting unit and the dummy mounting unit.

According to this interchangeable-lens camera, information about devices mounted to the lens mounting unit and the dummy mounting unit can be read in the camera body via information reading means, and the devices mounted to the lens mounting unit and the dummy mounting unit can thus be recognized.

With the interchangeable-lens camera described above, it is preferable that the camera body have an image display unit and a processing unit; and the processing unit read information about the device mounted to the dummy mounting unit via the information reading means, and display information about the device on the image display unit.

According to this interchangeable-lens camera, even when the devices mounted to the lens mounting unit and the dummy mounting unit cannot be visually identified, it is possible to immediately identify the devices.

With the interchangeable-lens camera described above, it is further preferable that the processing unit read information about the device mounted to the lens mounting unit and information about the device mounted to the dummy mounting unit via the information reading means and display the information about each device on the image display unit.

According to this interchangeable-lens camera, even when the devices mounted to the lens mounting unit and the dummy mounting unit cannot be visually identified, it is possible to immediately identify the devices.

With the interchangeable-lens camera, it is further preferable that the devices be lens units, and the information about the devices be characteristics of lenses contained in the lens units.

According to this interchangeable-lens camera, even when the devices mounted to the lens mounting unit and the dummy mounting unit cannot be visually identified, it is possible to immediately identify the devices.

With the interchangeable-lens camera, it is further preferable that the device mounted to the dummy mounting unit be an auxiliary battery compatible with the same lens mounting system as the lens unit.

According to this interchangeable-lens camera, by mounting the auxiliary battery to the dummy mounting unit, it is possible to read information about the remaining auxiliary battery level and so forth in the camera body via the information reading means.

With the interchangeable-lens camera, it is further preferable that the dummy mounting unit include a power terminal configured to supply electrical power to the camera body from the auxiliary battery mounted thereto.

According to this interchangeable-lens camera, electrical power can be supplied from the auxiliary battery while mounted to the dummy mounting unit, thus allowing long-term photography.

With the interchangeable-lens camera, it is preferable that the device mounted to the dummy mounting unit be an auxiliary memory compatible with the same lens mounting system as the lens unit.

According to this interchangeable-lens camera, by mounting the auxiliary memory to the dummy mounting unit, it is possible to read information about the amount of available auxiliary memory and so forth in the camera body via the information reading means.

With the interchangeable-lens camera, it is further preferable that the dummy mounting unit include an information terminal configured to supply information to the camera body from the auxiliary memory mounted thereto and supply information to the auxiliary memory from the camera body.

According to this interchangeable-lens camera, it is possible to save (store) acquired data or the like in the auxiliary memory while it is mounted to the dummy mounting unit, thus making it possible to take a large number of photographs.

This interchangeable-lens camera affords an advantage in that, even when the state of an auxiliary device mounted to the dummy mounting unit cannot be visually identified, the state thereof can be immediately identified and it can thus be used effectively.

An interchangeable-lens camera (hereinafter, referred to as "digital camera") will be described below with reference to FIGS. 1 to 4.

Figure 2:
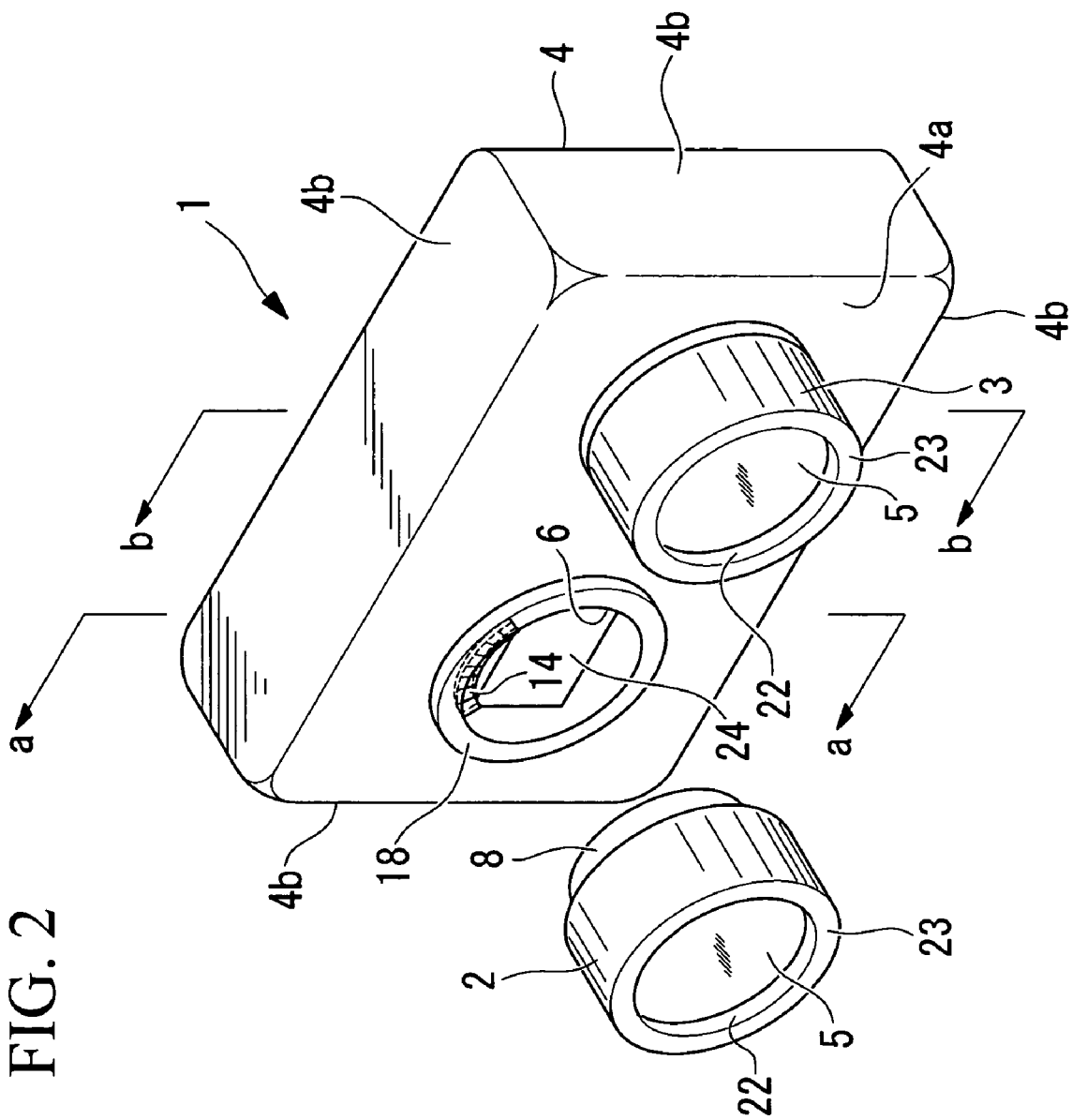
FIG. 2 is a schematic overall perspective view of the digital camera according to an embodiment of the present invention.
Figure 3:
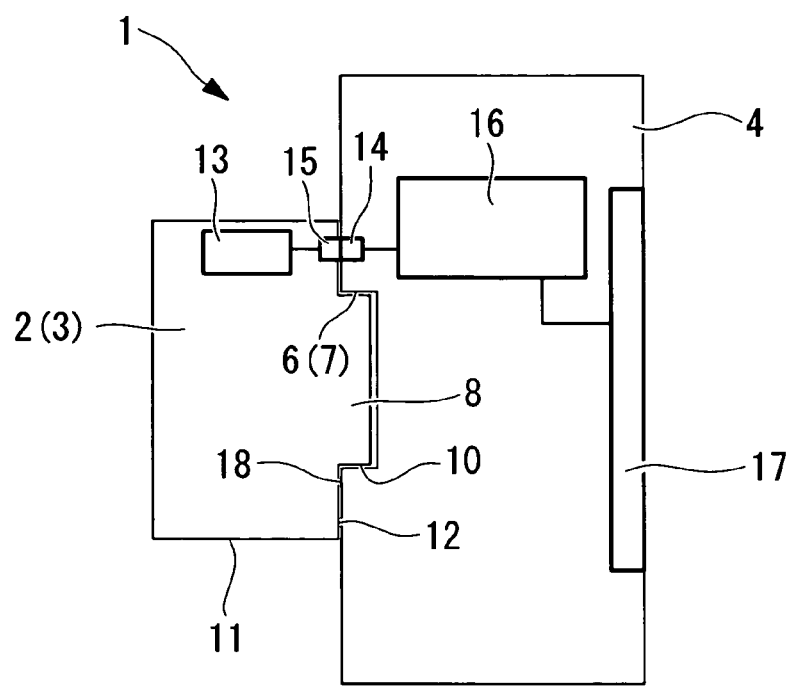
FIG. 3 is a sectional view taken along arrow a-a (b-b) in FIG. 2.
Figure 4:
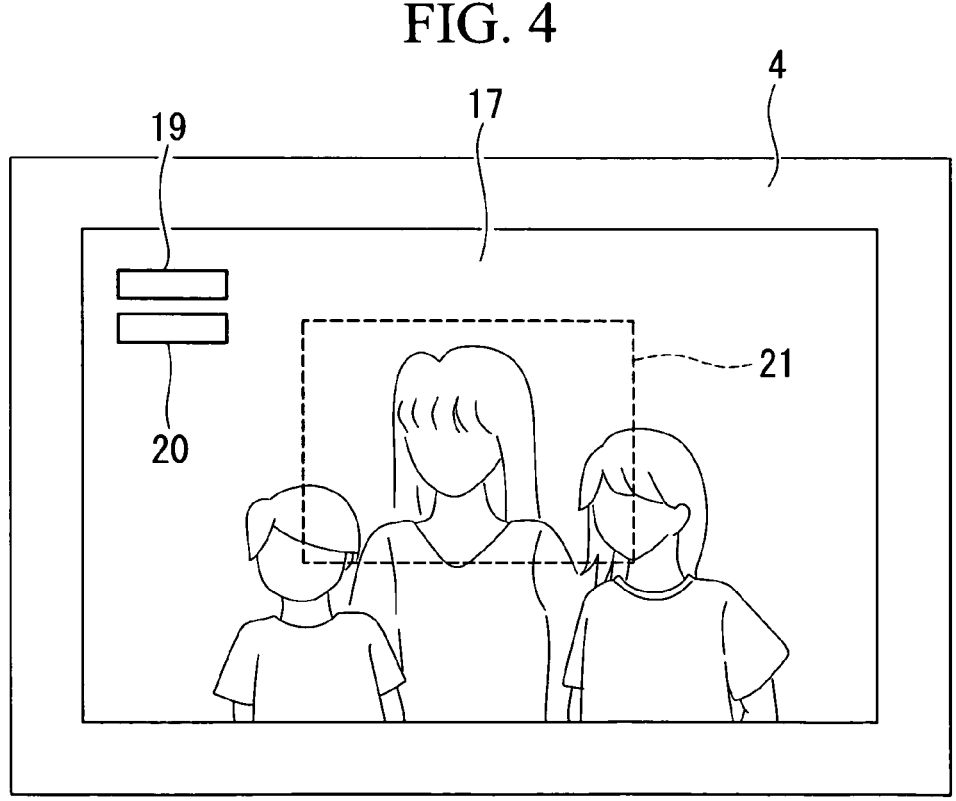
FIG. 4 is a schematic overall rear view of the digital camera according to an embodiment of the present invention.

FIG. 1 is a schematic overall perspective view of a camera body of the digital camera. FIG. 2 is a schematic overall perspective view of the digital camera. FIG. 3 is a sectional view taken along arrow a-a (b-b) of FIG. 2. FIG. 4 is a schematic overall rear view of the digital camera.

As shown in FIG. 2, the digital camera 1 includes, as main components, at least two lens units (photographic lens units) 2 and 3, and a camera body 4.

The lens units (devices) 2 and 3 according to this embodiment are cylindrical members with a circular shape in plan view, include at least one lens 5 for acquiring a subject image, have, for example, different magnifications, and are removably mounted to a front face 4a of the camera body 4.

As shown in FIG. 3, protruding portions (reduced-diameter portions) 8, which are received by (fitted with) a first fitting portion (hereinafter, referred to as "lens mounting unit") 6 or a second fitting portion (hereinafter, referred to as "dummy mounting unit") 7, described later, of the camera body 4, are provided at rear end portions of the lens units 2 and 3.

Reference numeral 4b in FIGS. 1 and 2 is the side face of the camera body 4.

The protruding portions 8 are formed so that outer circumferential surfaces 10 thereof are parallel to an optical axes of the lens units 2 and 3 (or outer circumferential surfaces 11 of the lens units 2 and 3). The outer circumferential surfaces 10 of the protruding portions 8 and the outer circumferential surfaces 11 of the lens units 2 and 3 are mated with (connected to) first fitting surfaces 12 that are formed so as to be parallel to a plane orthogonal to the optical axes of the lens units 2 and 3 (or the outer circumferential surfaces 11 of the lens units 2 and 3). At least one magnet (for example, the north pole of a magnet), not shown, is provided inside the lens units 2 and 3 and at an inner side (front face side) of the first fitting surfaces 12. In addition, memories (information reading means) 13 are provided inside the lens units 2 and 3. The memories 13 are electrically connected to lens-unit (device) terminals 15 which are provided at the rear end portions of the lens units 2 and 3, which are placed on the outer side, in the radial direction, of the protruding portions 8 and at positions where the front end portions thereof are in contact with the front surfaces of camera-body terminals 14, described later.

The camera body 4 is a box-shaped member having a substantially rectangular shape in plan view and includes an image-acquisition unit (CCD) 24 for acquiring the subject image, a processing unit (CPU) 16 for digitizing and storing the subject image acquired by the image-acquisition unit 24, and an image display unit 17 for displaying the subject image acquired by the image-acquisition unit 24. The image-acquisition unit 24 is disposed inside the camera body 4 and on the optical axis of the lens unit 2. The processing unit (information reading means) 16 is disposed inside the camera body 4. The lens mounting unit 6 that receives (is fitted with) the protruding portion 8 of the lens unit 2 used for photography is provided at the center of the left side on the front face of the camera body 4. The dummy mounting unit 7 that receives (is fitted with) the protruding portion 8 of the lens unit 3 for replacement (or backup) is provided at the center of the right side on the front face of the camera body 4. As shown in FIG. 4, an image display unit 17 is provided at substantially the center of the rear surface (surface on the opposite side from the front face of the camera body 4) of the camera body 4.

As shown in FIG. 3, the lens mounting unit 6 and the dummy mounting unit 7 are formed so that inner circumferential surfaces thereof are parallel to the outer circumferential surfaces 10 of the protruding portions 8, and the inner diameters thereof are formed slightly (a little) larger than the outer diameters of the protruding portions 8 (that is, the diameters of the outer circumferential surfaces 10) so that the lens units 2 and 3 can be inserted in and removed from the camera body 4 without any resistance (smoothly). The regions (positions) that are at the outer side, in the radial direction, of the lens mounting unit 6 and the dummy mounting unit 7 and that face the first fitting surfaces 12 when the lens units 2 and 3 are mounted to the camera body 4 are second fitting surfaces 18 that contact the first fitting surfaces 12. The second fitting surfaces 18 are made of magnetic members that attract magnets disposed at the inner side of the first fitting surfaces 12. Camera-body terminals 14, for exchanging (sending and receiving) signals between the lens units 2 and 3 and the camera body 4 by contacting the front end of the lens-unit terminals 15, are provided at the second fitting surfaces 18. The camera-body terminals 14 are electrically connected to the processing unit 16.

Information stored in the memories 13 (for example, lens-characteristic information, such as the type of lens, the focal length, the exit pupil position, and the like) is sent to the processing unit 16 via the lens-unit terminals 15 and the camera-body terminals 14, and is then displayed, for example, at the top left of the image display unit 17. In this embodiment, at the upper side thereof, that is, in a portion (region) shown by reference numeral 19 in FIG. 4, for example, a magnification of the lens unit 3 is displayed; and at the lower side thereof, that is, a portion (region) shown by reference numeral 20 in FIG. 4, for example, a magnification of the lens unit 2 is displayed.

According to this digital camera 1, the information about the lens units 2 and 3 (for example, the lens-characteristic information, such as the type of lens, the focal length, the exit pupil position, and the like), which are mounted (attached) to the lens mounting unit 6 and the dummy mounting unit 7, is sent to the processing unit 16 via the lens-unit terminals 15 and the camera-body terminals 14, and is then displayed on the image display unit 17.

Accordingly, even when the lens units 2 and 3 mounted to the lens mounting unit 6 and the dummy mounting unit 7 cannot be visually identified, a correct identification can be obtained at a glance by looking at the image display unit 17.

In addition, when the lens unit 3 mounted to the dummy mounting unit 7 is more suitable, for the image-acquisition conditions, than the lens unit 2 currently mounted to the lens mounting unit 6, it is possible to visually prompt a photographer to change to the lens unit 3.

In this embodiment, for example, when the photographer presses a button (not shown in the drawing), it is more preferable that the field of view when using the lens unit 3 mounted to the dummy mounting unit 7 be displayed on the image display unit 17, for example, by a broken line 21.

In this way, the user can confirm, on the image display unit 17, what kind of image-acquisition is possible when he or she changes the lens units.

Figure 5:
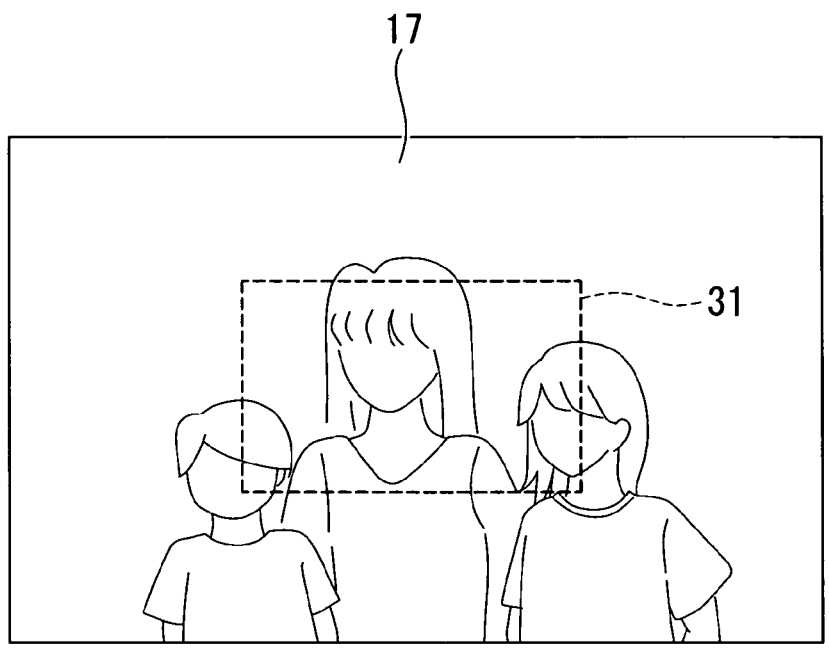
FIG. 5 is a rear view of a digital camera according to another embodiment of the present invention.

FIG. 5 shows an example in which information about the lens units, namely, that a wide-angle lens (W) is mounted to the lens mounting unit 6 and a telephoto lens (T) is mounted to the dummy mounting unit 7, is displayed on the image display unit 17.

In this embodiment and the following embodiments, information about the lens units may be displayed by pressing an information display switch, or it may be temporarily displayed in conjunction with a release button.

The image display unit 17 is configured so that the field of view when using the lens unit 3 mounted to the dummy mounting unit 7 is displayed by a broken line 31. In this way, the photographer can confirm, on the image display unit 17, what kind of image-acquisition is possible when he or she changes the lens units.

Figure 6:
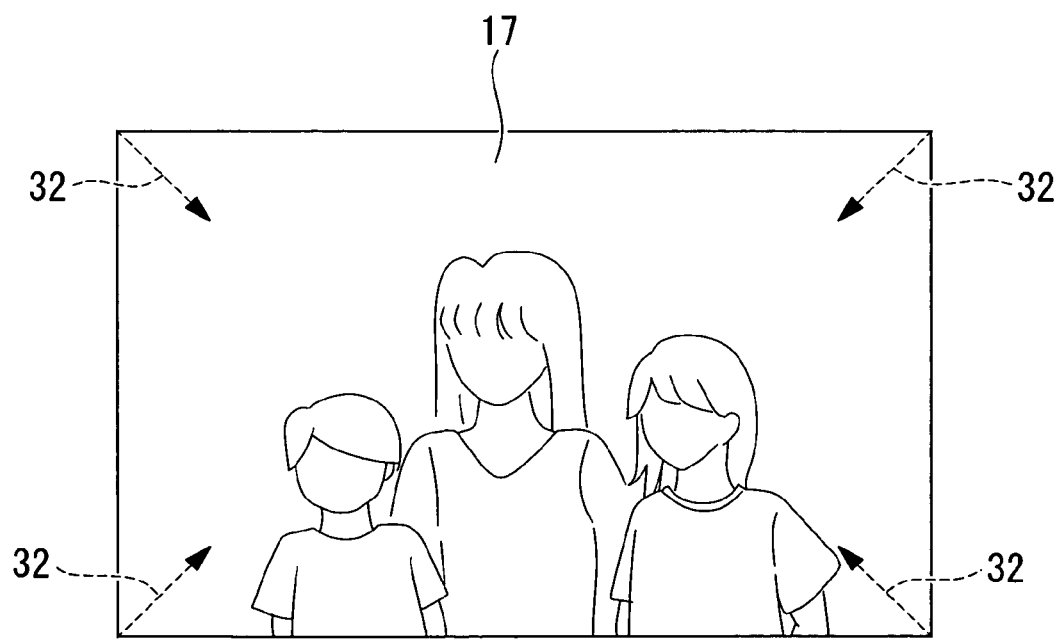
FIG. 6 is a rear view of a digital camera according to another embodiment of the present invention.

FIG. 6 shows an example in which information about the lens units, namely, that the wide-angle lens (W) is mounted to the lens mounting unit 6 and the telephoto lens (T) is mounted to the dummy mounting unit 7, is displayed on the image display unit 17. The image display unit 17 is configured so that the field of view when using the lens unit 3 mounted to the dummy mounting unit 7 is displayed by arrows 32 pointing from the four corners of the screen to the center.

In particular, when the lens unit mounted to the dummy mounting unit 7 is a zoom lens, by indicating the variable range of the focal length by lengths of the arrows 32, it is possible to show a zoomable range, which is a further advantage.

Figure 7:
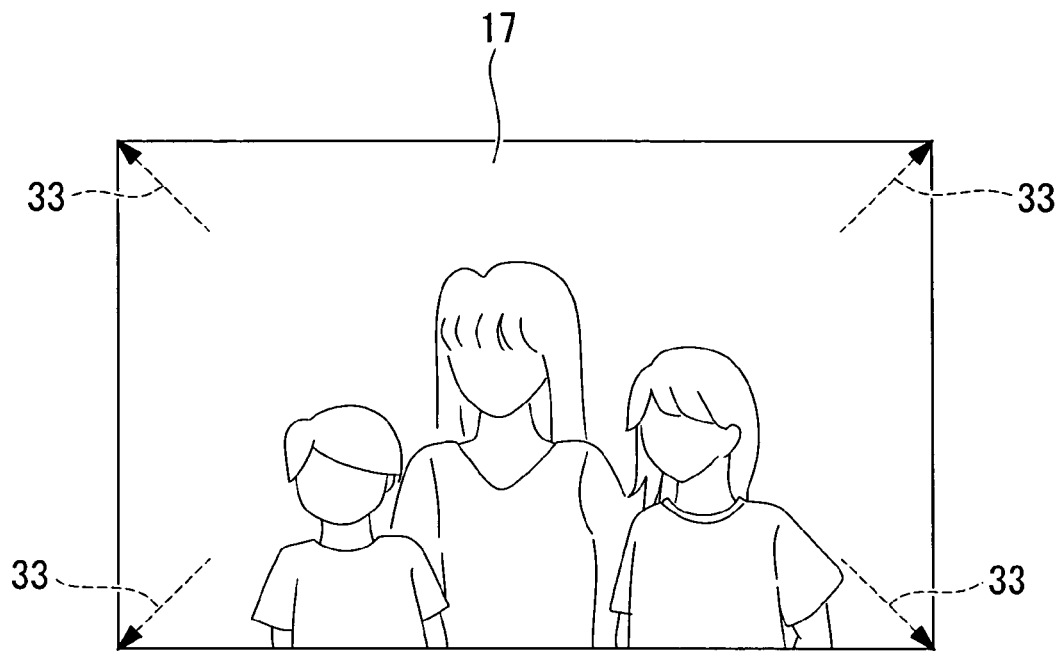
FIG. 7 is a rear view of a digital camera according to yet another embodiment of the present invention.

FIG. 7 shows an example in which information about the lens units, namely, that the telephoto lens (T) is mounted to the lens mounting unit 6 and the wide-angle lens (W) is mounted to the dummy mounting unit 7, is displayed on the image display unit 17. The field of view when using the lens unit 3 mounted to the dummy mounting unit 7 is displayed on the image display unit 17 by arrows 33 pointing from the center part to the four corners of the screen.

Figure 8:
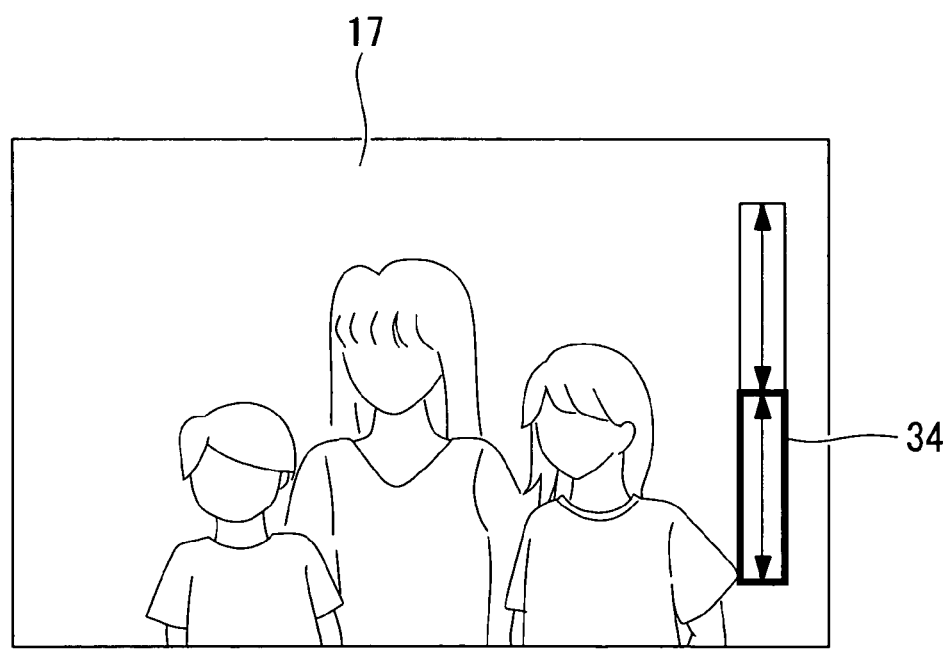
FIG. 8 is a rear view of a digital camera according to yet another embodiment of the present invention.

FIG. 8 shows an example in which information about the lens units, namely, that the wide-angle zoom lens (W) is mounted to the lens mounting unit 6 and the telephoto zoom lens (T) is mounted to the dummy mounting unit 7, is displayed on the image display unit 17. A zoom indicator 34 showing a zoomable range of the zoom lens units 3 mounted to the lens mounting unit 6 and the dummy mounting unit 7 is vertically aligned and displayed at the right edge of the screen of the image display unit 17.

In this embodiment, the part of the zoom indicator 34 in the lower part of the screen indicates a wide-angle end (W), and the part of the zoom indicator 34 in the upper part of the screen indicates a telephoto end (T). Because the wide-angle zoom lens is mounted to the lens mounting unit 6, a border around the lower half of the zoom indicator 34 is displayed in an emphasized manner.

In particular, the zoom position of the lens currently in-use may be displayed on the zoom indicator 34.

Figure 9:
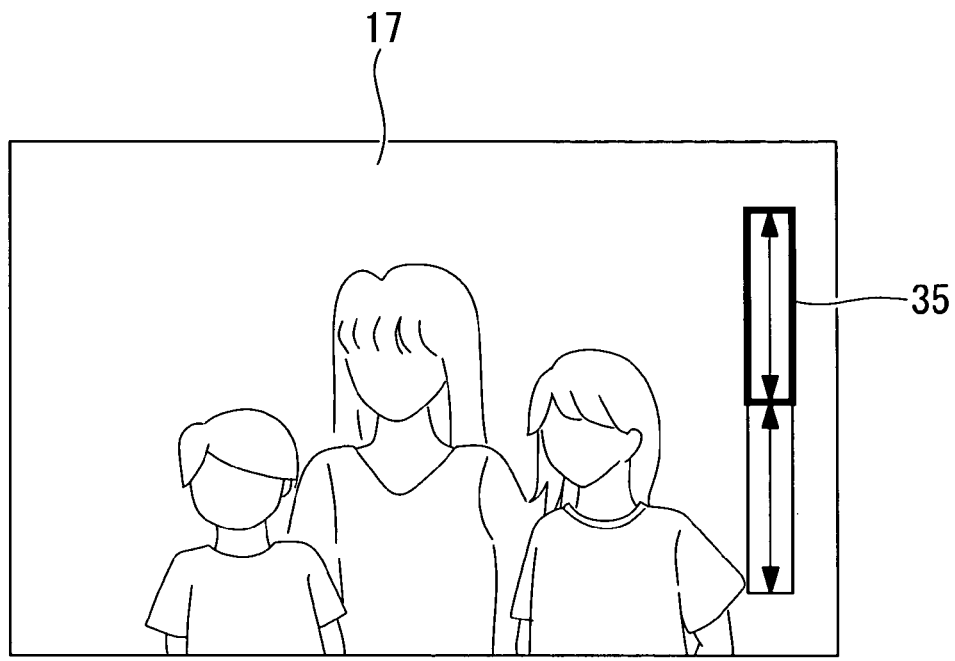
FIG. 9 is a rear view of a digital camera according to yet another embodiment of the present invention.

FIG. 9 shows an example in which information about the lens units, namely, that the telephoto zoom lens (T) is mounted to the lens mounting unit 6 and the wide-angle zoom lens (W) is mounted to the dummy mounting unit 7, is displayed on the image display unit 17. A zoom indicator 35 showing a zoomable range of the zoom lens units 3 mounted to the lens mounting unit 6 and the dummy mounting unit 7 is vertically aligned and displayed at the right edge of the screen of the image display unit 17.

In this embodiment, the part of the zoom indicator 35 in the lower part of the screen indicates the wide-angle end (W), and the part of the zoom indicator 35 in the upper part of the screen indicates the telephoto end (T). Because the telephoto zoom lens (T) is mounted to the lens mounting unit 6, a border around the upper half of the zoom indicator 35 is displayed in an emphasized manner.

In particular, the zoom position of the lens currently in-use may be displayed on the zoom indicator 35.

Figure 10:
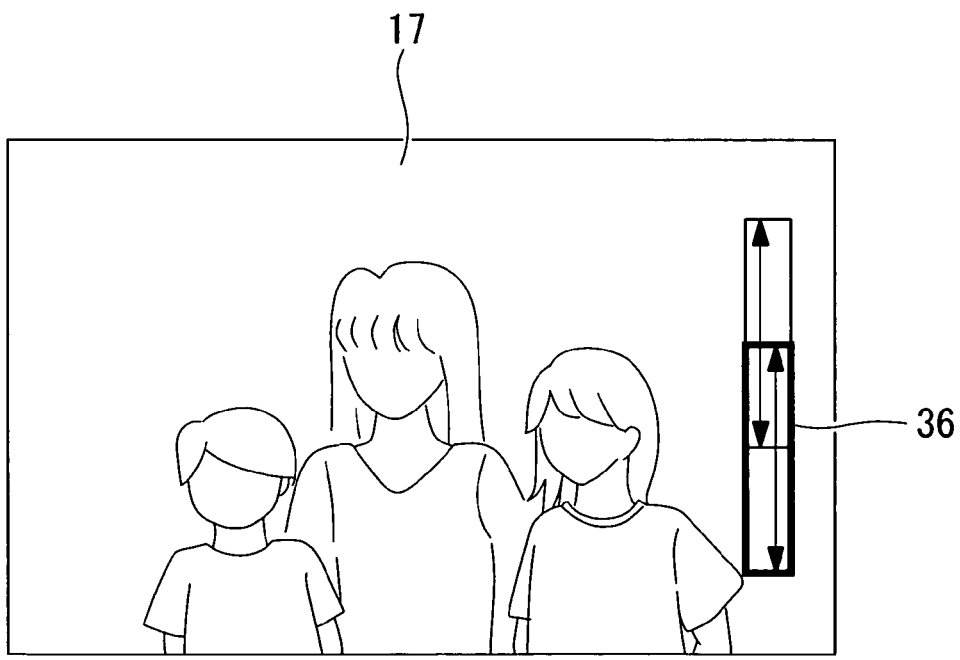
FIG. 10 is a rear view of a digital camera according to yet another embodiment of the present invention.

FIG. 10 shows an example in which information about the lens units, namely, that the wide-angle zoom lens (W) is mounted to the lens mounting unit 6 and the telephoto zoom lens (T) is mounted to the dummy mounting unit 7, is displayed on the image display unit 17. A zoom indicator 36 showing a zoomable range of the zoom lens units 3 mounted to the lens mounting unit 6 and the dummy mounting unit 7 is vertically aligned and displayed at the right edge of the screen of the image display unit 17.

In this embodiment, the part of the zoom indicator 36 in the lower part of the screen indicates the wide-angle end (W), and the part of the zoom indicator 36 in the upper part of the screen indicates the telephoto end (T). Because the wide-angle zoom lens (W) is mounted to the lens mounting unit 6, a border around the lower half of the zoom indicator 36 is displayed in an emphasized manner.

In addition, in this embodiment, because the focal lengths of each of the lenses partly overlap, the part of the zoom indicator at the wide-angle end and the part of the zoom indicator at the telephoto end are displayed partly overlapped.

Furthermore, similar to the other embodiments described above, the zoom position of the lens currently in-use may be displayed in the zoom indicator 36.

Figure 11:
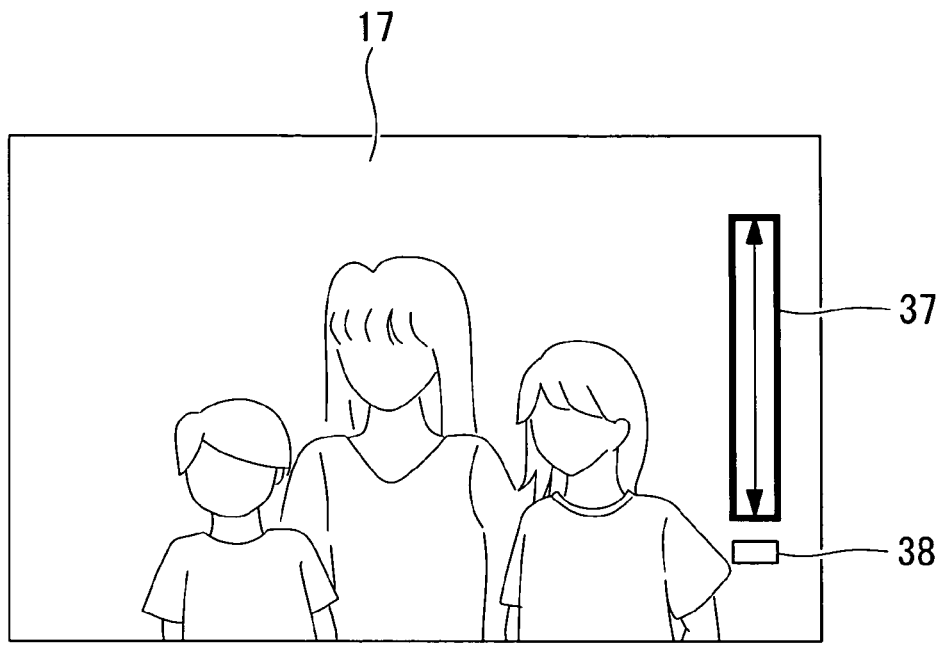
FIG. 11 is a rear view of a digital camera according to yet another embodiment of the present invention.

FIG. 11 shows an example in which information about the lens units, namely, that the telephoto zoom lens (T) is mounted to the lens mounting unit 6 and the wide-angle lens (W) of the fixed-focal-length is mounted to the dummy mounting unit 7, is displayed on the image display unit 17. A zoom indicator 37 showing a zoomable range of the zoom lens units 3 mounted to the lens mounting unit 6 and the dummy mounting unit 7, and an indicator 38 showing the focal length of the wide-angle lens are vertically aligned and displayed at the right corner of the screen of the image display unit 17.

In this embodiment, the part of the zoom indicator 37 in the lower part of the screen indicates the wide-angle end (W), and the part of the zoom indicator 37 in the upper part of the screen indicates the telephoto end (T). The zoom indicator 37 and the indicator 38 are vertically disposed at positions corresponding to their own focal lengths (or in their own focus ranges).

In this embodiment, because the telephoto zoom lens (T) is mounted to the lens mounting unit 6, the zoom indicator 37 is displayed in an emphasized manner.

Figure 12:
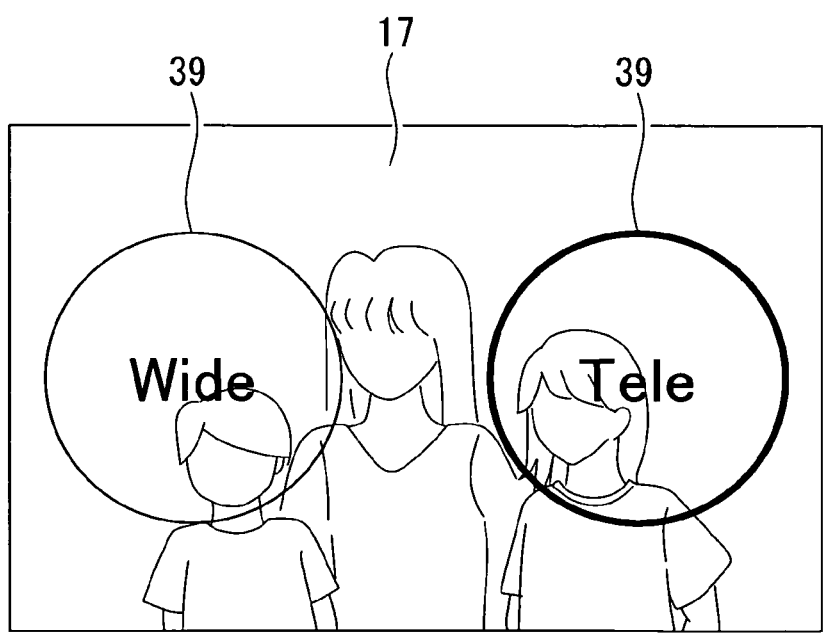
FIG. 12 is a rear view of a digital camera according to yet another embodiment of the present invention.

FIG. 12 shows an example in which information about the lens units, namely, that the telephoto zoom lens (T) is mounted to the lens mounting unit 6 and the wide-angle lens (W) with a fixed-focal-length is mounted to the dummy mounting unit 7, is displayed on the image display unit 17. Circular indicators 39 are displayed on the image display unit 17 so as to correspond to the positions at which the lens mounting unit 6 and the dummy mounting unit 7 are formed on the camera body 4. It is preferable that the indicators 39 display identification letters or symbols indicating the wide-angle lens (W) or the telephoto lens (T).

In this embodiment, because the telephoto zoom lens (T) is mounted to the lens mounting unit 6, the circular indicator 39 at the telephoto zoom lens (at the right side of the screen) is emphasized.

Figure 13:
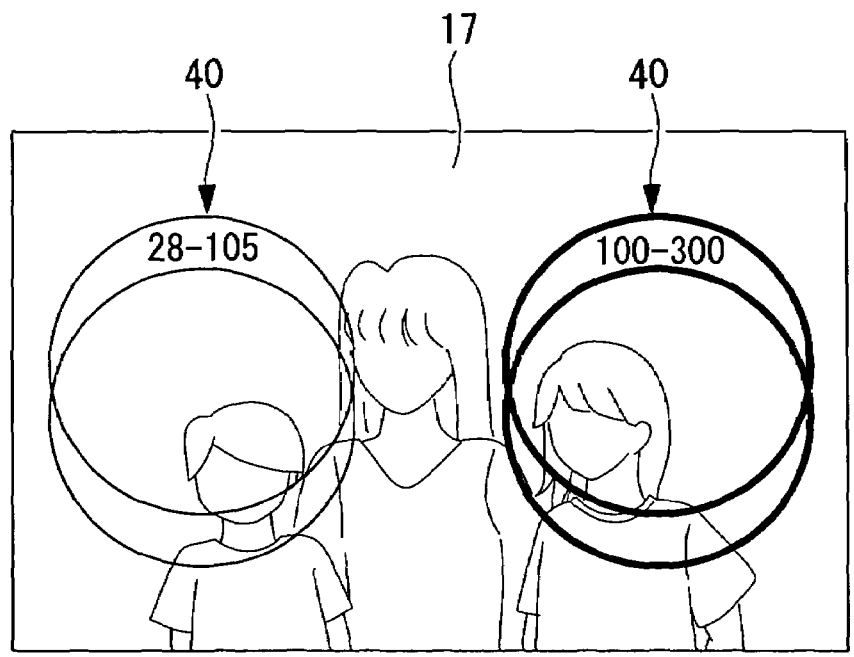
FIG. 13 is a rear view of a digital camera according to yet another embodiment of the present invention.

In addition, as shown in FIG. 13, indicators 40 may be displayed three-dimensionally.

The digital camera is not limited to the embodiments described above. Instead of the lens unit 3 having a lens function, accessory units (devices) having a memory function or a battery function, which are constructed similarly to the lens units 2 and 3 described above, may be mounted to the dummy mounting unit 7.

Accordingly, the memory capacity of the digital camera 1 can be increased when the accessory units have the memory function, and the battery capacity of the digital camera 1 can be increased when the accessory units have the battery function. In addition, when the accessory units have the memory function, the memory capacity (or amount of remaining memory) provided in the accessory units is displayed on the image display unit 17. When the accessory unit has the battery function, the battery capacity (or remaining battery level) provided in the accessory unit is displayed on the image display unit 17.

It is further preferable that recesses (third fitting portions) 22 (see FIG. 2) be provided at the front end portions of the lens units 2 and 3, which receive (fit with) the protruding portions 8 (see FIG. 3) that are formed at the rear end portions of the accessory units or another (yet another) lens unit (for example, a wide-angle lens unit).

The recesses 22 are formed so that the inner circumferential surfaces thereof are parallel to the outer circumferential surfaces 10 of the protruding portions 8, and the inner diameters thereof are formed slightly (a little) larger than the outer diameters of the protruding portions 8 (that is, the diameters of the outer circumferential surfaces 10) so that the accessory units or other (yet other) lens units can be inserted in and removed from the front faces thereof without any resistance (smoothly). The regions (positions) that are at the outer side, in the radial direction, of the recesses 22 and that face the first fitting surfaces 12 when the accessory units or other (yet other) lens units are mounted to the lens units 2 and 3 are third fitting surfaces 23 that contact the first fitting surfaces 12 (see FIG. 2). The third fitting surfaces 23 are made of magnetic members that attract magnets disposed at the inner side of the first fitting surfaces 12.

By doing so, for example, simply by bringing the accessory unit having the battery function close to the lens unit 3 mounted to the dummy mounting unit 7 and then bringing the accessory unit having the memory function close to this accessory unit, it is possible to attract the magnets and the magnetic members, thus coupling together these lens units and the accessory units one behind the other in the axial direction (that is, in the optical axis direction of the lens unit 3) by the attraction force, enabling them to be carried together.

In such a case, a configuration wherein information about the lens unit 3 and the accessory unit mounted to the dummy mounting unit 7 is displayed on the image display unit 17 is preferable.

In the embodiment described above, signal exchange between the memory 13 and the processing unit 16 is electrically carried out via the camera-body terminals 14 and the lens-unit terminals 15; however, the present invention is not limited to this. It may be carried out wirelessly or the like, rather than via these camera-body terminals 14 and the lens-unit terminals 15.

Figure 14:
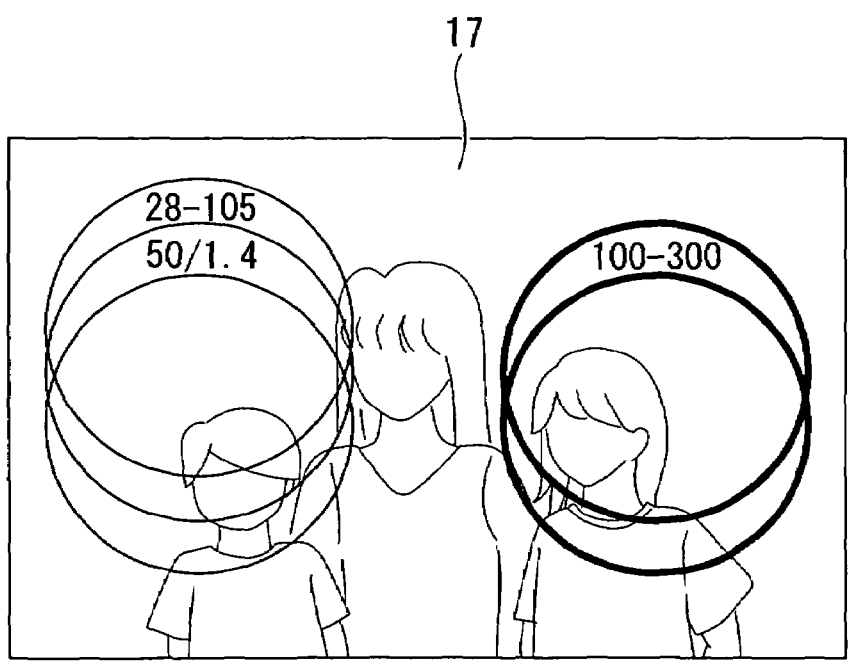
FIG. 14 is a rear view of a digital camera according to yet another embodiment of the present invention.
Figure 15:
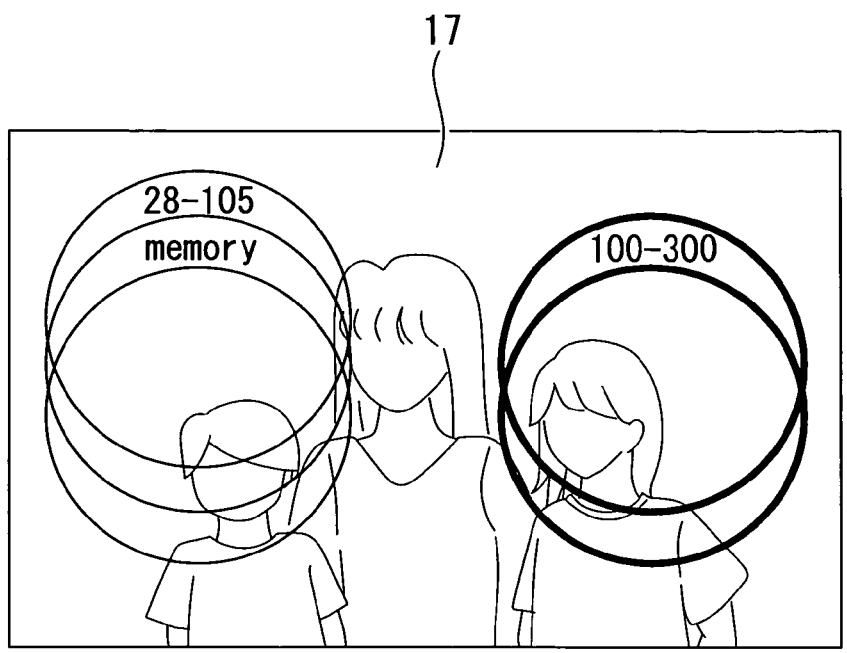
FIG. 15 is a rear view of a digital camera according to yet another embodiment of the present invention.
Figure 16:
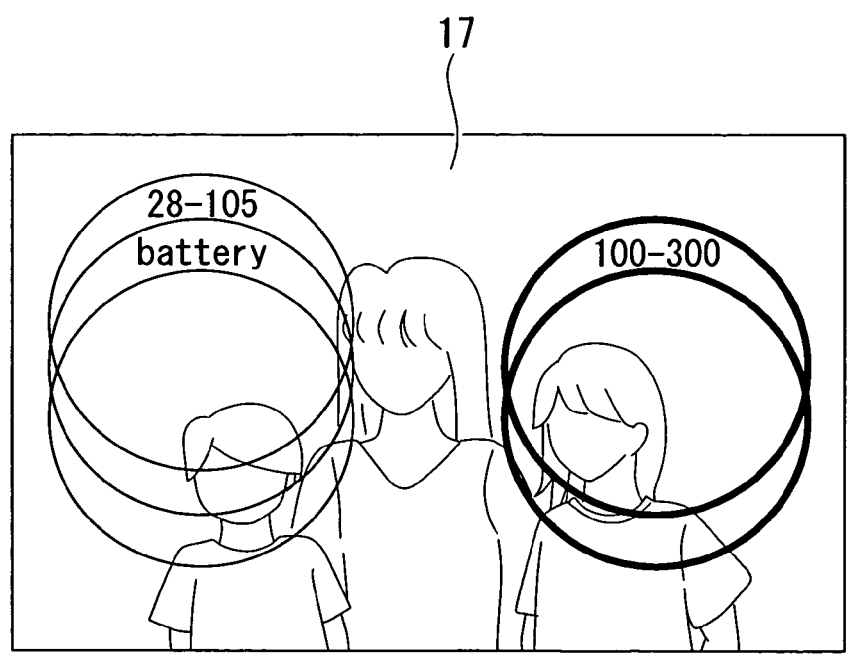
FIG. 16 is a rear view of a digital camera according to yet another embodiment of the present invention.

FIGS. 14 to 16 show examples in which information about the devices is displayed on the image display unit 17, when any of the lens units and the accessory units described above is mounted to the lens mounting unit and the dummy mounting unit one behind the other.

FIG. 14 shows an example in which a zoom lens having a focal length of 28 mm to 100 mm, and a fixed-focal-length lens having a focal length of 50 mm and an f-number of 1.4 are mounted to the dummy mounting unit one behind the other; and a zoom lens having a focal length of 100 mm to 800 mm is mounted to the lens mounting unit.

FIG. 15 shows an example in which a zoom lens having a focal length of 28 mm to 100 mm and an accessory unit having a memory function are mounted to the dummy mounting unit one behind the other; and a zoom lens having a focal length 100 mm to 800 mm is mounted to the lens mounting unit.

FIG. 16 shows an example in which a zoom lens having a focal length of 28 mm to 100 mm and an accessory unit having a battery function are mounted to the dummy mounting unit one behind the other; and a zoom lens having a focal length of 100 mm to 800 mm is mounted to the lens mounting unit.

In each embodiment shown in FIGS. 14 to 16, a memory capacity, the amount of usage thereof, and remaining battery level of the accessory units may be displayed.

What is claimed is:

1. An interchangeable-lens camera on which a lens unit is capable to mount, the interchangeable-lens camera comprising:
   a camera body;
   wherein
   a lens mounting unit which is provided to the camera body and on which the lens unit is capable to mount,
   at least one dummy mounting unit which is provided to the camera body and on which a device is capable to mount under the same lens mounting system as the lens mounting unit;
   a first information reading means for reading information about the lens unit mounted to the lens mounting unit; and
   a second information reading means for reading information about the device mounted to the dummy mounting unit.

2. An interchangeable-lens camera according to claim 1, wherein
   the camera body has an image display unit and a processing unit; and
   the processing unit reads information about the device mounted to the dummy mounting unit via the second information reading means and displays information about the device on the image display unit.

3. An interchangeable-lens camera according to claim 2, wherein
   the processing unit reads information about the device mounted to the lens mounting unit via the first information reading means and reads information about the device mounted to the dummy mounting unit via the second information reading means and displays the information about each device on the image display unit.

4. An interchangeable-lens camera according to claim 2, wherein
   the device is a lens unit, and the information about the device is characteristics of lenses contained in the lens unit.

5. An interchangeable-lens camera according to claim 1, wherein
   the device mounted to the dummy mounting unit is battery compatible with the same lens mounting system as the lens unit.

6. An interchangeable-lens camera according to claim 5, wherein
   the dummy mounting unit includes a power terminal configured to supply electrical power to the camera body from the battery mounted thereto.

7. An interchangeable-lens camera according to claim 1, wherein
   the device mounted to the dummy mounting unit is memory compatible with the same lens mounting system as the lens unit.

8. An interchangeable-lens camera according to claim 7, wherein
   the dummy mounting unit includes an information terminal configured to supply information to the camera body from the memory mounted thereto and supply information to the memory from the camera body.

9. An interchangeable-lens camera according to claim 4, wherein
   the second information reading means reads the information about the lens unit mounted to the dummy mounting unit, and
   the image display unit displays the information about a field of view in the case when the lens unit mounted to the dummy mounting unit is mounted to the lens mounting unit on the basis of the information reads via the second information reading means.

* * * * *